United States Patent
Fleming et al.

(10) Patent No.: US 6,823,440 B2
(45) Date of Patent: Nov. 23, 2004

(54) METHOD AND APPARATUS FOR ISOLATING FRAMES IN A DATA PROCESSING SYSTEM

(75) Inventors: Matthew David Fleming, Austin, TX (US); Mark Douglass Rogers, Austin, TX (US); David William Sheffield, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 10/227,518

(22) Filed: Aug. 22, 2002

(65) Prior Publication Data

US 2004/0039885 A1 Feb. 26, 2004

(51) Int. Cl.[7] .............................................. G06F 12/02
(52) U.S. Cl. .................................................... 711/173
(58) Field of Search ............................ 711/6, 153, 173

(56) References Cited

U.S. PATENT DOCUMENTS

| | | | | |
|---|---|---|---|---|
| 4,779,188 A | * | 10/1988 | Gum et al. | 718/1 |
| 4,967,353 A | * | 10/1990 | Brenner et al. | 711/160 |
| 5,544,349 A | * | 8/1996 | Berry et al. | 711/165 |

* cited by examiner

*Primary Examiner*—Kevin L. Ellis
(74) *Attorney, Agent, or Firm*—Duke W. Yee; Mark E. McBurney

(57) ABSTRACT

A method, apparatus, and computer instructions for managing frames. Frames intended for isolation are identified in which the frames include in-use frames and free frames. Reservation of free frames from the frames identified as intended for isolation is requested. Successfully reserved frames are moved to an isolation list. In-use frames are marked, and unisolated/unmarked frames are identified. Any free frames in the unisolated frames are moved to the isolation list. In-use frames in the unisolated frames are marked and reservation of the in-use frames in the unisolated frames is released.

18 Claims, 4 Drawing Sheets

METHOD AND APPARATUS FOR ISOLATING FRAMES IN A DATA PROCESSING SYSTEM

BACKGROUND OF THE INVENTION

1. Technical Field

The present invention relates generally to an improved data processing system, and in particular, to a method and apparatus for managing resources in a data processing system. Still more particularly, the present invention provides a method and apparatus for isolating frames as part of the process in allocating and reallocating resources in a data processing system.

2. Description of Related Art

In a data processing system, one or more operating systems will operate depending on the particular design. Many user data processing systems, such as home computers and workstations, use only a single operating system at any one time. Some systems, such as servers, may run multiple operating systems. For example, a server may run multiple instances of an operating system in which each instance provides a particular function. In either case, resources are allocated or partitioned within an operating system or between operating systems. Specifically, frames may be assigned or allocated to one or more logical domains within an operating system or between operating systems. Within an operating system, dividing memory into more than one logical domain is often desirable for purposes of scalability. For example, the ability to run multiple instances of page-replacement algorithms is desirable. Further, these instances are required to work on discrete pieces of memory. Thus, these instances may be run in different logical domains, by dividing the memory into several logical domains. A frame is a fixed block of data that is located in memory.

In maintaining or configuring a data processing system, it may be desirable to reallocate resources, such as processors, memory, and various devices. In the reallocation of memory, frames may be currently in use by a process. If a particular frame is in use and located in a portion of memory that is to be reallocated, that portion of memory cannot be reallocated until the frame is free. As a result, reallocation of resources is often difficult when one or more operating systems are currently executing on the data processing system. Often times, a reallocation of resources is configured with the reallocation taking place after rebooting or restarting the data processing system. Such a process takes time and interrupts services provided to users.

Therefore, it would be advantageous to have an improved method, apparatus, and computer instructions for dynamically reallocating resources in a data processing system.

SUMMARY OF THE INVENTION

The present invention provides a method, apparatus, and computer instructions for managing frames. Frames intended for isolation are identified in which the frames include in-use frames and free frames. Reservation of free frames from the frames identified as intended for isolation is requested. Successfully reserved frames are moved to an isolation list. In-use frames are marked, and unisolated/unmarked frames are identified. Any free frames in the unisolated frames are moved to the isolation list. In-use frames in the unisolated frames are marked and reservation of the in-use frames in the unisolated frames is released.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
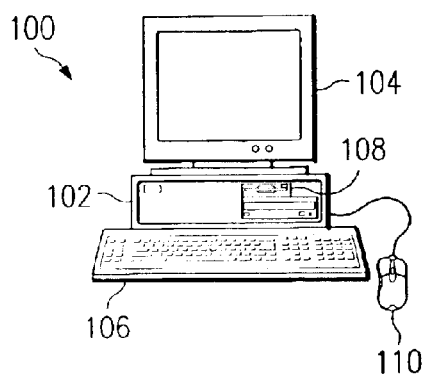
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
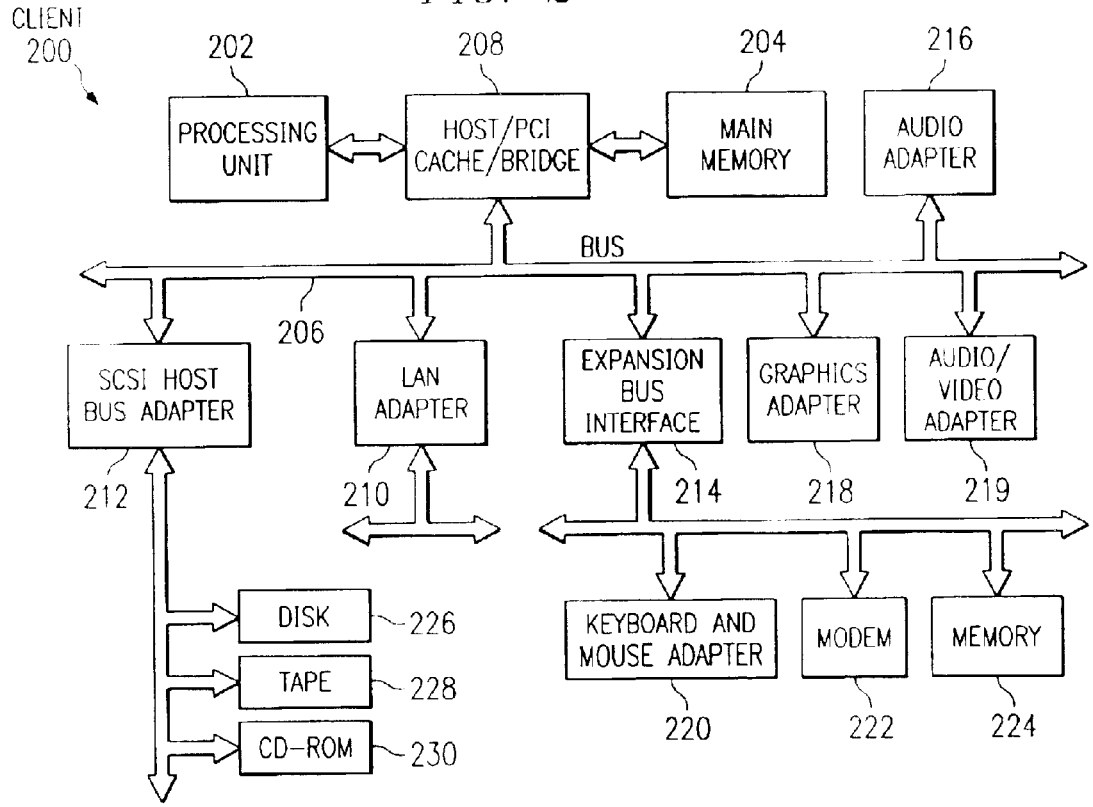
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processing unit 202 and main memory 204 are connected to PCI local bus 206 through PCI bridge 208. Processing unit 202 may contain a single central processing unit or multiple central processing units depending on the particular implementation. PCI bridge 208 also may include an integrated memory controller and cache memory for processing unit 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processing unit 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processing unit 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM drive 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. The processes of the present invention are performed by processing unit 202 using computer implemented instructions, which may be located in a memory such as, for example, main memory 204, memory 224, or in one or more peripheral devices 226-230. When processing unit 202 contains a number of processors, data processing system 200 may be configured with logical partitions in which different operating systems may execute concurrently. A logical partitioned (LPAR) functionality within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and input/output (I/O) adapter bus slots. The partition's resources are represented by the platform's firmware to the OS image.

The mechanism of the present invention may be used to reallocate resources within an operating system or between operating systems. The mechanism of the present invention allows for a group of frames to be isolated from a running instance of an operating system. This isolation allows the frames to be removed from an operating system or to move the frames from one logical domain to another logical domain.

Figure 3:
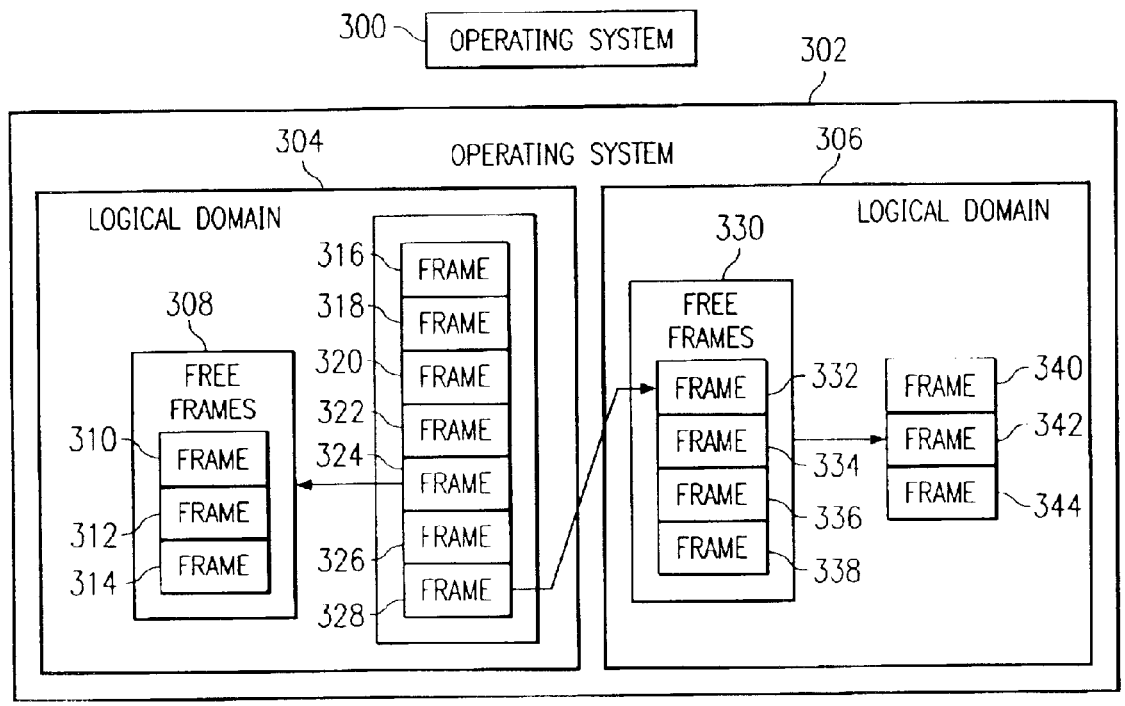
FIG. 3 is a diagram illustrating components used in isolating frames in accordance with a preferred embodiment of the present invention.

Turning now to FIG. 3, a diagram illustrating components used in isolating frames is depicted in accordance with a preferred embodiment of the present invention. In this example, operating system 300 and operating system 302 are instances of operating systems executing on a data processing system, such as data processing system 200 in FIG. 2. Operating system 302 includes logical domain 304 and logical domain 306.

Free frames 308 is a list of frames containing frames 310, 312, and 314. The frames listed in free frames 308 are frames which are not in use and may be used by logical domain 304. These frames within free frames 308 are allocated to logical domain 304. Frames 316, 318, 320, 322, 324, 326, and 328 are frames assigned to logical domain 304 and which are currently in use by logical domain 304. If a frame currently in use by logical domain 304 is freed up, that frame is returned to free frames 308. Free frames 330 is a list of frames containing frames 332, 334, 336, and 338, which are not in use and may be used by logical domain 306. Frames 340, 342, and 344 are frames currently in use by logical domain 306. If a frame in use by logical domain 306 is freed up, that frame is returned to free frames 330. In these examples, the frames are page frames and contain a segment of data.

If memory is to be reallocated, frames located in that portion of the memory must be isolated from use to prevent errors in execution. For example, memory may be reallocated from operating system 302 to operating system 300. If frames 312, 314, 318, and 324 are located in a portion of memory that is to be reallocated, all of these frames should be freed up from use before the reallocation may occur to avoid errors or crashes. Frame 324 is currently in use by logical domain 304. The mechanism of the present invention is used to free up and isolate frames to allow for the reallocation of memory without requiring restarting of the operating system.

Further, frames may be isolated for reallocation of those frames for use by another domain in this example. If frame 326 is to be reallocated from logical domain 304 to logical domain 306, this frame may be freed up and then isolated to prevent its reuse by logical domain 304. Once frame 326 is a free frame, this frame may be reallocated for use by logical domain 306 by adding this free frame to free frames 330. When reallocating frames from one logical domain to another logical domain within the same operating system instance, movement of the frame from in-use to free and then to a different free frame group may not be required. In-use frames may possibly be moved from one logical domain to another logical domain in a direct fashion.

The present invention employs a mechanism for reserving and obtaining free frames, a mechanism for transitioning a frame from in use to a free state, and a mechanism for broadcasting messages at some favored priority level in which messages are responded to by processors running at less favored priority levels. These mechanisms are mechanisms that may be currently found in Advanced Interactive Executive (AIX), which is a product available from International Business Machines Corporation.

The mechanism of the present invention uses these features to obtain locks for frames, such as those in use and free. In the instance in which a frame is moved from one logical domain to another logical domain, an in-use frame could be moved without isolation. In the instance in which a movement of an in-use frame is not possible or it is desired to remove the frames from use by an operating system, an indication is made that the frame is to be isolated.

Figure 4:
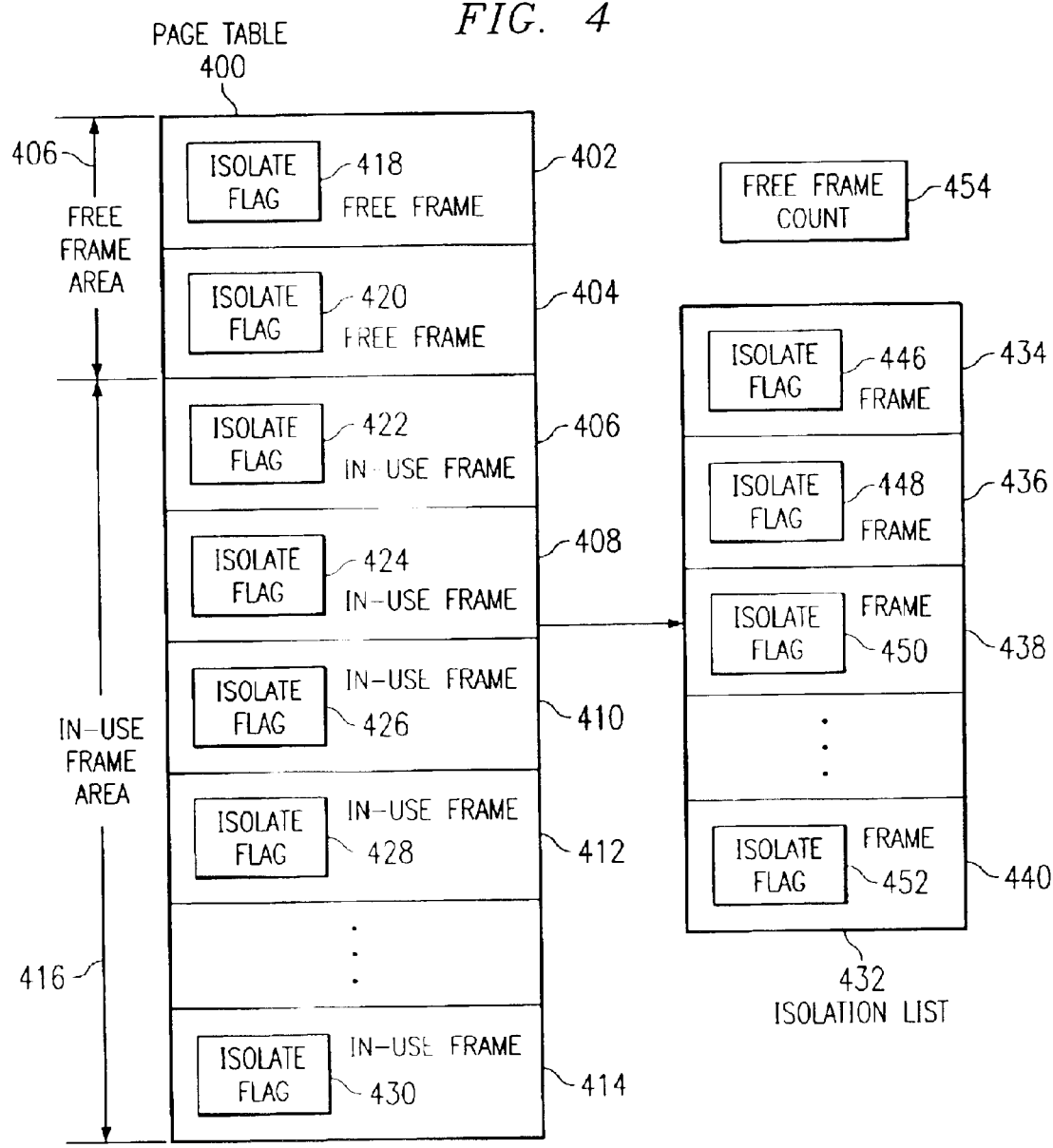
FIG. 4 is a diagram illustrating components used in isolating frames from an operating system in accordance with a preferred embodiment of the present invention.

With reference now to FIG. 4, a diagram illustrating components used in isolating frames from an operating system is depicted in accordance with a preferred embodiment of the present invention. In this example, page table 400 contains a list of frames. Free frames 402 and 404 are in free frame area 406, which is similar to free frames 308 in FIG. 3. In-use frame 406, 408, 410, 412, and 414 are located in in-use frame area 416 in page table 400.

In removing frames from use in the operating system, isolate flags, such as isolate flags 418, 420, 422, 424, 426, 428, and 430 are set for frames located within page table 400. In these examples, the flags are each a single bit set in page table 400. The mechanism of the present invention attempts to make a reservation of free frame 402 and free frame 404. If the reservation succeeds, these frames are added to isolation list 432. When a successful reservation is made for a free frame from page table 400, free frame count 454 is decremented by the reservation mechanism. If the reservation cannot be made at this time, the mechanism of the present invention decrements this counter to make a future reservation. Under the mechanism of the present invention, it is possible for the counter to become negative.

Isolation list 432 contains frames 434, 436, 438, and 440 in this example. Each of these frames has an isolate flag, such as isolate flags 446, 448, 450, and 452, set. As frames are isolated from use, these frames are added to isolation list 432. An isolate flag identifies the frame as one to be placed in isolation list 432. In these examples, free frames 402 and 404 contain isolate flags. Such a marking of free frames is not required, depending on the particular implementation.

Figure 5:
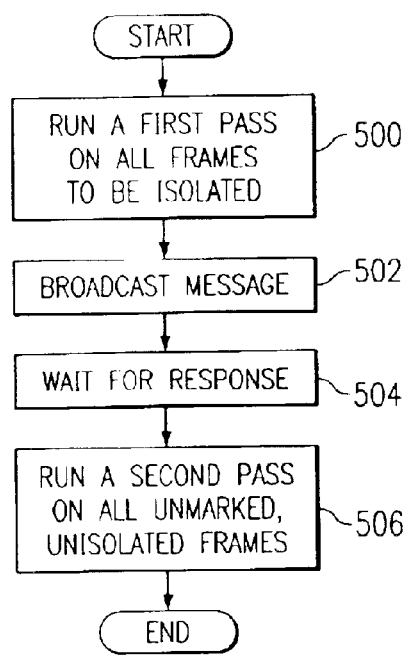
FIG. 5 is a flowchart of a process used for isolating frames in accordance with a preferred embodiment of the present invention.

With reference now to FIG. 5, a flowchart of a process used for isolating frames is depicted in accordance with a preferred embodiment of the present invention. The process illustrated in FIG. 5 may be implemented in a data processing system, such as data processing system 200 in FIG. 2.

The process begins by running a first pass on all frames to be isolated (step 500). The details of the steps performed in the first pass are described in more specificity below in the description of FIG. 6. The message is broadcast (step 502). The broadcast message is set at the same priority as this code to receive a message from the processors in the data processing system only after the reservation processes have finished running. The process waits for a response from all of the processors in the data processing system (step 504). Step 504 is used to determine when the processors have finished executing code used for frame reservations performed in the first pass in step 500. The process runs a second pass on all unmarked, unisolated frames (step 506) and the process terminates thereafter. The steps involved in the second pass are described in more detail below in the description of FIG. 7.

Figure 6:
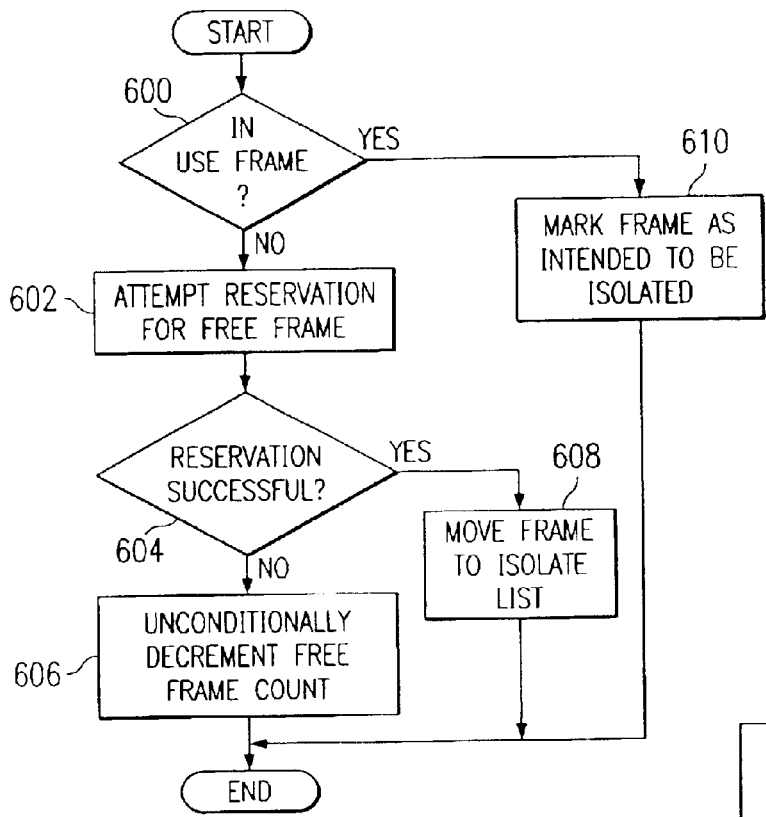
FIG. 6 is a flowchart of a process for performing a first pass on frames intended for isolation in accordance with a preferred embodiment of the present invention.

Turning now to FIG. 6, a flowchart of a process used for performing a first pass on frames intended for isolation is depicted in accordance with a preferred embodiment of the present invention. The process illustrated in FIG. 6 is a more detailed description of the steps performed in a first pass of frames in step 500 in FIG. 5. The process in FIG. 6 is performed for each frame in the set of frames processed in the first pass.

The process begins by determining whether the frame is an in-use frame (step 600). If the frame is not an in-use frame, the frame is a free frame and a reservation is attempted for the free frame (step 602). In this example, this reservation is made using a reservation mechanism such as that currently found in AIX. The request to reserve frames initiates execution of reservation code on the processors in the data processing system. Thereafter, a determination is made as to whether the reservation is successful (step 604). If the reservation is not successful, the free frame count is unconditionally decremented (step 606). Free frames are allocated by placing a reservation and then using the reservation at a later time. Normally, the free frame count would always be greater than or equal to zero. The free frame count plus the number of outstanding reservations is equal to the length of the free frame list.

Returning again to step 604, if the reservation is successful, the frame is moved to the isolate list (step 608) with the process terminating thereafter. With reference again to step 600, if the frame is an in-use frames, the frame is marked as intended to be isolated (step 610) with the process terminating thereafter. The frame may be marked with an indicator, such as an isolate flag, as illustrated in FIG. 4 to indicate that this frame is to be moved to the isolate list when the frame becomes free. Frames transition in the normal course of operating system execution from in use to free. When frames become free and are placed back onto the free list, these frames are not placed on the free list, but instead are placed into the isolation list.

Figure 7:
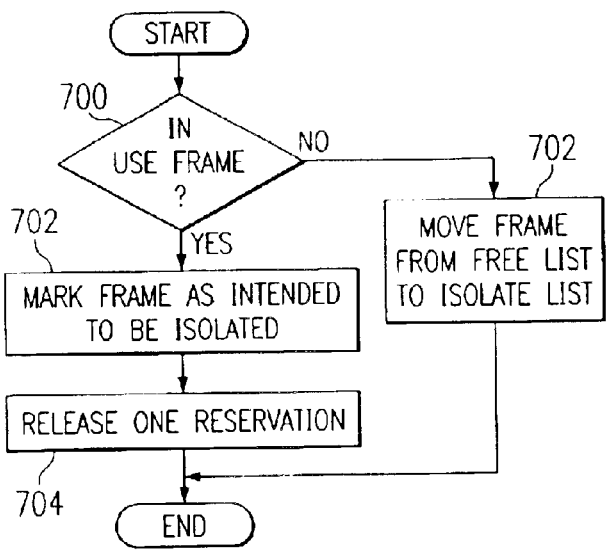
FIG. 7 is a flowchart of a process used for performing a second pass on frames intended for isolation in accordance with a preferred embodiment of the present invention.

With reference now to FIG. 7, a flowchart of a process used for performing a second pass on frames intended for isolation is depicted in accordance with a preferred embodiment of the present invention. The process illustrated in FIG. 7 is a more detailed description of the steps performed in a second pass of frames in step 506 in FIG. 5. The process in FIG. 7 is performed for each frame in the set of frames processed in the second pass.

The process begins by determining whether the frame is an in-use frame (step 700). If the frame is an in-use frame, the frame is marked as intended to be isolated (step 702). In-use frames identified in the second pass are frames that were free during the first pass and ones on which a reservation was made. One reservation is released (step 704) and the process terminates thereafter. The reservation is released from a counter, such as free frame count 454 in FIG. 4.

Returning to step 700, if the frame is not an in-use frame, the frame is a free frame and this free frame is moved from the free list to the isolate list (step 702) and the process terminates thereafter.

Figure 8:
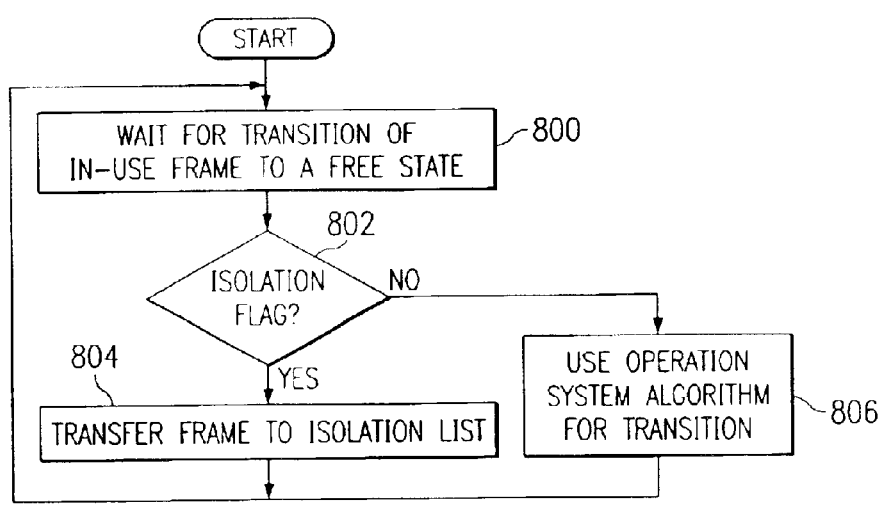
FIG. 8 is a flowchart of a process for placing frames in an isolation list in accordance with a preferred embodiment of the present invention.

Turning now to FIG. 8, a flowchart of a process for placing frames in an isolation list is depicted in accordance with a preferred embodiment of the present invention. This process is implemented in a data processing system, such as data processing system 200 in FIG. 2.

The process begins by waiting for a transition of an in-use frame to a free state (step 800). When such a transition is detected, a determination is made as to whether an isolate flag is set for the frame (step 802). If an isolate flag is set, the frame is transferred to an isolation list and becomes unavailable for use (step 804) with the process returning to step 800. If an isolate flag is not set, the process follows the original operating system algorithm for a transition from an in-use state to a free frame state (step 806) with the process then returning to step 800.

Thus, the present invention provides an improved method, apparatus, and computer instructions for isolating frames in a data processing system. The mechanism of the present invention allows for reallocation of resources in a dynamic fashion without requiring the restarting of an operating system. The mechanism of the present invention marks frames and places frames into an isolation list to remove them for use by a process, such as an operating system or a logical domain. As a result, frames may be reallocated, or resources associated with the frames may be reallocated, while minimizing or preventing errors in execution.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the illustrations show the use of page frames, the mechanism of the present invention may be applied to any type of data structure or segment used by a data processing system. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing frames, the method comprising:

identifying frames intended for isolation, wherein the frames include in-use frames and free frames;

requesting reservation of free frames from the frames identified as intended for isolation;

moving successfully reserved free frames to an isolate list;

identifying unisolated frames in the frames identified as intended for isolation;

moving any of the free frames in the unisolated frames to the isolate list; and marking the in-use frames in the unisolated frames and releasing reservation of the in-use frames in the unisolated frames.

2. The method of claim 1, wherein marked in-use frames are placed in the isolate list when these frames are free.

3. The method of claim 1 further comprising:

reallocating memory associated with the frames identified as intended for isolation.

4. The method of claim 1 further comprising:

broadcasting a message to processors in the data processing system after requesting reservation of free frames, wherein the message has a priority equal to processes for making frame reservations; and waiting for a response from the processors in the data processing system prior to identifying unisolated frames.

5. The method of claim 1, wherein the frames are isolated from an operating system.

6. The method of claim 1, wherein a free frame is isolated by reserving the free frame.

7. The method of claim 1, wherein the frames identified as intended for isolation are reallocated to another logical domain.

8. The method of claim 1, wherein the frames identified as intended for isolation are frames associated with a reallocation of memory.

9. A data processing system for managing frames, the data processing system comprising:

a bus system;

a communications unit connected to the bus system;

a memory connected to the bus system, wherein the memory includes a set of instructions; and a processing unit connected to the bus system, wherein the processing unit executes the set of instructions to identify frames intended for isolation in which the frames include in-use frames and free frames; request reservation of free frames from the frames identified as intended for isolation; move successfully reserved free frames to an isolate list; identify unisolated frames; move any free frames in the unisolated frames to an isolate list; and mark in-use frames in the unisolated frames and release reservation of the in-use frames in the unisolated frames.

10. A data processing system for managing frames, the data processing system comprising:

first identifying means for identifying frames intended for isolation, wherein the frames include in-use frames and free frames;

requesting means for requesting reservation of free frames from the frames identified as intended for isolation;

first moving means for moving successfully reserved free frames to an isolate list;

second identifying means for identifying unisolated frames;

second moving means for moving any free frames in the unisolated frames to an isolate list; and marking means for marking in-use frames in the unisolated frames and releasing reservation of the in-use frames in the unisolated frames.

11. The data processing system of claim 10, wherein marked in-use frames are placed in the isolate list when these frames are free.

12. The data processing system of claim 10 further comprising:

reallocating means for reallocating memory associated with the frames identified as intended for isolation.

13. The data processing system of claim 10 further comprising:

broadcasting means for broadcasting a message to processors in the data processing system after requesting reservation of free frames, wherein the message has a priority equal to processes for making frame reservations; and waiting means for waiting for a response from the processors in the data processing system prior to identifying unisolated frames.

14. The data processing system of claim 10, wherein the frames are isolated from an operating system.

15. The data processing system of claim 10, wherein a free frame is isolated by reserving the free frame.

16. The data processing system of claim 10, wherein the frames identified as intended for isolation are reallocated to another logical domain.

17. The data processing system of claim 10, wherein the frames identified as intended for isolation are frames associated with a reallocation of memory.

18. A computer program product in a computer readable medium for managing frames, the computer program product comprising:

first instructions for identifying frames intended for isolation, wherein the frames include in-use frames and free frames;

second instructions for requesting reservation of free frames from the frames identified as intended for isolation;

third instructions for moving successfully reserved free frames to an isolate list;

fourth instructions for identifying unisolated frames;

fifth instructions for moving any free frames in the unisolated frames to an isolate list; and sixth instructions for marking in-use frames in the unisolated frames and releasing reservation of the in-use frames in the unisolated frames.

* * * * *